United States Patent

Adams et al.

[11] Patent Number: 5,118,514
[45] Date of Patent: Jun. 2, 1992

[54] BROWNING COMPOSITION

[75] Inventors: Robert M. Adams, Sherman Oaks; Nicholas Melachouris, Westlake Village, both of Calif.

[73] Assignee: Nestec S.A., Vevey, Switzerland

[21] Appl. No.: 599,935

[22] Filed: Oct. 19, 1990

[51] Int. Cl.5 .......................... A23L 1/025; A23L 1/05; A23L 1/275

[52] U.S. Cl. ........................................ 426/94; 426/241; 426/250; 426/540; 426/305; 426/573; 426/658; 426/262

[58] Field of Search ............... 426/250, 262, 540, 243, 426/302, 305, 241, 94, 597, 658, 573

[56] References Cited

U.S. PATENT DOCUMENTS

| | | | |
|---|---|---|---|
| 4,278,694 | 7/1981 | Chiu | 426/314 |
| 4,552,776 | 11/1985 | Tse | 426/540 |
| 4,735,812 | 4/1988 | Bryson et al. | 426/262 |
| 4,882,184 | 11/1989 | Buckholz et al. | 426/549 |
| 4,963,376 | 10/1990 | Nafisi-Movaghar | 426/307 |
| 4,968,522 | 11/1990 | Steinke et al. | 426/540 |
| 4,985,261 | 1/1991 | Kang et al. | 426/262 |

FOREIGN PATENT DOCUMENTS 62-186764  8/1987  Japan .................................... 426/262

Primary Examiner—Jeanette Hunter

[57] ABSTRACT

This invention is directed to the use of soluble tea solids as a browning agent for use in the microwave baking of foods having an unbaked dough crust, such as meat pies and fruit pies. The soluble tea solids are coated onto the dough crust in the form of an aqueous solution obtained by the aqueous extraction of tea leaves or by the reconstitution of instant tea powder, or in the form of an emulsion of the aqueous solution with oil. A small amount of a hydrocolloid gum preferably is included in the aqueous solution to provide a thickened solution of soluble tea solids, which is coated onto the dough crust.

10 Claims, No Drawings

BROWNING COMPOSITION

BACKGROUND OF THE INVENTION

This invention relates to a browning composition for foods having a dough crust. More particularly, the invention relates to a browning composition obtained by the extraction of tea leaves which when coated onto the dough crust of a food product provides the product with a desirable browned crust upon microwave heating.

The usage of microwave ovens in homes has increased significantly in recent years and continues to increase. While microwave cooking of foods affords a significant time savings over conventional convection oven cooking, it suffers from the disadvantage that foods cooked by microwave energy lack the desired degree of surface browning that foods, particularly those having a dough crust such as meat pies and fruit pies, have when cooked in a conventional oven.

The most common reaction responsible for surface browning during cooking of products having a dough crust is the well-known Maillard reaction (non-enzymatic browning) between naturally occurring reducing sugars and compounds containing an amino group, e.g. amino acids, peptides and proteins, which results in the formation of colored melanoidins. The rate at which the Maillard reaction proceeds to form the colored pigments increases markedly with temperature. When foods containing a dough crust, such as frozen pies, are heated in a conventional oven, the crust is heated to considerably higher temperatures than the interior of the pie, with the high surface temperatures being sufficient to achieve browning. However, in microwave heating the heat energy is released internally within the food so that the surface remains at a relatively even temperature with the interior. Consequently the high surface temperature necessary to achieve browning are not reached within the time required to bake the pie.

A number of compositions have been proposed heretofor to create a desirable browned surface on foods heated by microwave energy. Such prior microwave browning compositions typically are based on the Maillard reaction to effect browning, and include one or more components which permit the reaction to take place at lower temperatures or which increase the reaction rate. However, none of these prior compositions has been entirely satisfactory due to flavor concerns, cost, ineffectiveness, difficulty of use, and other problems.

SUMMARY OF THE INVENTION

It has now been found that water soluble tea solids obtained by the aqueous extraction of tea leaves, particularly black tea leaves, are an effective browning agent for foods having an unbaked dough crust, such as meat pies and fruit pies.

In accordance with the present invention, soluble tea solids, in the form of either a thickened aqueous solution or emulsion, are coated onto the surface of the uncooked dough crust of a meat or fruit pie. Upon heating the coated uncooked pie with microwave radiation, a desirable browned surface is developed on the crust during the time normally required to bake the pie, with the crust having a browned surface substantially similar to that obtained by baking the pie in a conventional convection oven.

The browning composition of the present invention comprises an aqueous solution water soluble tea solids and a minor amount of one or more water soluble or water dispersible hydrocolloid gums sufficient to provide a thickened browning composition. If desired, instant tea powder prepared by the hot water extraction of tea leaves, such as described in *World Coffee and Tea*, April 1972, pages 54-57, may be reconstituted with water to provide the aqueous solution of soluble tea solids. In addition, a small amount of a water soluble alkali, such as alkali metal carbonates, hydroxides, and the like may be included in the aqueous solution to increase the pH of the solution above about 7.0. In accordance with a preferred embodiment of the invention, an edible oil such as vegetable oil, corn oil, soy oil, and the like is emulsified with the aqueous solution of soluble tea solids to provide the browning composition coated onto the dough crust. The inclusion of oil, typically between about 5% to 25% by weight of the aqueous solution, enhances the browning effect of the composition.

DESCRIPTION OF PREFERRED EMBODIMENTS

As noted hereinabove, the present invention is directed to the use of soluble tea solids as a microwave browning agent for foods having an unbaked dough crust with the soluble tea solids being applied to the dough crust either as an aqueous solution or an oil-water emulsion of such an aqueous solution.

The soluble tea solids are obtained by the conventional hot water extraction of black tea leaves. For example, the amount of water used for the extraction may be from 4 to 15 parts by weight per part by weigh of solid matter. The duration of the extraction is conventional, typically up to 30 minutes. The temperature of the water used for the extraction may be any temperature conventionally used for the hot extraction of tea leaves, such as from about 60~ C. to 125~ C. The extraction of soluble solids from the tea leaves may be carried out batchwise or counter-currently, with the aqueous extract being separated from the tea leaves by any conventional procedure, such as filtering or centrifuging, upon completion of extraction. The aqueous extract thus obtained may be used as such in the browning composition of this invention.

Alternatively, conventional instant tea powder may be reconstituted with water to provide the aqueous solution of soluble tea solids. The amount of tea solids in the solution which will produce the desired browning effect upon heating can be readily determined by those skilled in the art without undue experimentation. For example, an aqueous solution containing about 1.0% by weight soluble tea solids derived from the reconstitution of instant tea is an effective microwave browning agent.

The browning composition of this invention also includes an amount of hydrocolloid gum sufficient to thicken the aqueous solution of tea solids, such as, for example, about 0.5% by weight of xanthan gum, carboxymethyl cellulose, and the like. Thickening of the aqueous solution with such hydrocolloid gums is generally advantageous in that the thickened solution is retained in place on the surface of the dough crust upon application.

If, desired, an alkaline material, such as alkalimetal carbonates, hydroxides, and the like, may be included in the aqueous solution to increase the pH of the solution to alkaline values, in order to solubilize cold-water insoluble materials in the solution, such as complexes of caffeine and polyphenols.

The aqueous solution of soluble tea solids may be applied to the dough crust as such or may, if desired, be emulsified with an edible oil such as vegetable oil, corn oil, soy oil, and the like for application to the crust. For example, a coating composition formed by emulsifying the aqueous solution of tea solids with from about 5% to 25% by weight oil provides enhanced browning of a dough crust upon microwave heating.

The browning composition can be conveniently coated, such as by brushing, spraying, and the like onto the surface of a previously formed dough crust of a food to be baked, such as a meat pie or fruit pie. Satisfactory results are obtained when the composition is coated onto the surface of the dough crust at a level of about 0.008 to 0.02 gm/sq. cm. The crust may be formed of any of the well known dough materials conventionally used in the preparation of crusts for frozen pies, such as flour, water, fat or shortening, as well as conventional additives for modifying flavor and/or texture. The coating composition may be applied to the dough crust at the time the pie is prepared after which the resulting product is frozen and maintained in a frozen state until baking. Alternatively, the coating composition may be applied to the dough surface after the pie has been frozen.

The food product having the dough crust which has been coated with the composition of this invention may be baked in a microwave oven utilizing conventional time-temperature relationships which will vary depending on the nature and size of the product. During microwave heating, the surface of the dough crust undergoes a browning reaction to provide a baked crust having a desirable golden brown appearance substantially the same as that obtained by baking the food product in a conventional convection oven.

It is believed that the browned surface produced on the coated dough crust is due to the formation of colored pigments in the coating composition upon heating. While not wishing to be bound by any particular theory, it is believed that the theaflavins and thearubigins resulting from the enzymatic oxidation of the phenolic constituents of tea solids such as epigallocatechin gallate, epicatechin gallate, epigallocatechin, and epicatechin, by polyphenol oxidase undergo polymerization with the formation of brown melanin pigments.

The following examples are intended to illustrate more fully the nature of the present invention. Unless otherwise indicated, all parts and percentages are by weight.

EXAMPLE 1

100 gms of black tea leaves were extracted for 30 minutes with 900 gm water which had been brought to the boiling point. The spent leaves were then separated from the clear extract. To 99.5 gm of the aqueous extract was added 0.5 gm of carboxymethyl cellulose and 2 gm of the resulting thickened solution was brushed onto the dough crust of a frozen conventional chicken pot pie having a surface area of 180 sq. cm. The coated pie was then baked in a 700 watt microwave oven at high setting for 10 minutes. The resulting baked product had a golden brown crust substantially identical to that obtained by baking the frozen pie in a conventional convection oven at 204~ C. for 40 minutes.

EXAMPLE 2

An aqueous browning composition was prepared by mixing the following ingredients

| Ingredient | Amount (gm) |
| --- | --- |
| Instant tea powder | 1.0 |
| Sodium carbonate | 1.0 |
| Xanthan gum | 0.5 |
| Water | 97.5 |

Twenty parts by weight of liquid vegetable oil was emulsified with eighty parts by weight of the aqueous composition, and the resulting emulsion sprayed onto the dough crust surface of a frozen pot pie at a level of about 0.008 to 0.01 gm of coating emulsion per sq. cm. of dough crust. After coating, the frozen pie was heated in a 700 watt microwave oven at high power for 9 minutes. The crust of the baked pie had a desirable golden brown appearance which extended over substantially the entire crust. The browned appearance of the baked crust was substantially identical to that resulting from baking the pie in a conventional convection oven at 204~ C. for 40 minutes.

What is claimed is:

1. A method for treating a food product having a dough crust to render the crust brownable upon microwave heating which comprises applying to the surface of the dough crust a thickened aqueous solution consisting essentially of water soluble tea solids and a hydrocolloid gum, with the water soluble tea solids being present in an amount effective to develop a browned surface on the crust when heated by microwave energy and the hydrocolloid gum being present in an amount sufficient to provide a thickened aqueous solution.

2. The method defined in claim 1 in which the thickened aqueous solution is emulsified with an edible oil to provide a thickened aqueous emulsion which is coated onto the surface of the crust.

3. The method defined in claim 2 in which the emulsion contains from about 5% to 25% by weight of edible oil.

4. The method defined in claim 1 in which the soluble tea solids comprise instant tea powder which has been reconstituted with water.

5. The method defined in claim 4 in which the reconstituted soluble tea solids solution has a pH of greater than 7.0.

6. The method defined in claim 5 in which an edible alkaline material is added to the reconstituted soluble tea solids solution to increase the pH of the solution above 7.0.

7. The method defined in claim 1 in which the aqueous solution is coated onto the surface of the dough crust at a level of about 0.008 to 0.02 gm of solution per sq. cm of crust.

8. A microwave browning composition which consists essentially of an aqueous solution of water soluble tea solids and an amount of hydrocolloid gum sufficient to thicken the solution.

9. The composition defined in claim 8 in which the aqueous solution contains a thickening amount of a hydrocolloid gum selected from the group of xanthan gum and carboxymethyl cellulose.

10. The composition defined in claim 8 in which the composition comprises an emulsion of the aqueous solution with an edible oil.

* * * * *